United States Patent
Shiwa

(10) Patent No.: US 6,680,896 B2
(45) Date of Patent: Jan. 20, 2004

(54) MEDIUM ATTACHING DEVICE AND DISK DRIVE APPARATUS

(75) Inventor: Masayuki Shiwa, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 183 days.

(21) Appl. No.: 09/950,021

(22) Filed: Sep. 12, 2001

(65) Prior Publication Data

US 2002/0031077 A1 Mar. 14, 2002

(30) Foreign Application Priority Data

Sep. 14, 2000 (JP) .................................... 2000-279678

(51) Int. Cl.⁷ ............................................ G11B 17/028
(52) U.S. Cl. .................................... 369/271; 369/270
(58) Field of Search ............................... 369/270, 271

(56) References Cited

U.S. PATENT DOCUMENTS

| | | | |
|---|---|---|---|
| 2,937,916 A | 5/1960 | Hohnecker | |
| 4,351,047 A | 9/1982 | Redlich et al. | |
| 4,390,979 A | 6/1983 | Saito et al. | |
| 4,649,531 A * | 3/1987 | Horowitz et al. | 369/270 |
| 5,006,945 A | 4/1991 | Furusawa | |
| 5,014,143 A | 5/1991 | Mori et al. | |
| 5,128,818 A | 7/1992 | Koizumi et al. | |
| 5,166,920 A * | 11/1992 | Kogure | 369/270 |
| 5,398,141 A | 3/1995 | Tannert | |
| 5,631,894 A | 5/1997 | Takahashi | |
| 5,637,200 A | 6/1997 | Tsymberov | |
| 5,644,564 A * | 7/1997 | Peters | 369/270 |
| 5,646,934 A | 7/1997 | Mizuno et al. | |
| 5,689,388 A | 11/1997 | Oka et al. | |
| 5,715,115 A | 2/1998 | Takarasawa et al. | |
| 5,761,186 A | 6/1998 | Mushika et al. | |
| 5,774,445 A | 6/1998 | Sawi et al. | |
| 5,793,135 A | 8/1998 | Suzuki et al. | |
| 5,793,740 A | 8/1998 | Nguyen | |
| 5,923,110 A | 7/1999 | Zhao et al. | |
| 5,956,315 A * | 9/1999 | Sawai et al. | 369/270 |
| 6,005,755 A | 12/1999 | Muse et al. | |
| 6,038,206 A * | 3/2000 | Mukawa | 369/271 |
| 6,069,766 A | 5/2000 | Battu et al. | |
| 6,198,716 B1 * | 3/2001 | Tamiya et al. | 369/270 |
| 6,249,506 B1 | 6/2001 | Oowaki et al. | |

FOREIGN PATENT DOCUMENTS

| | | | | |
|---|---|---|---|---|
| JP | 59185081 A | * | 10/1984 | ........... G11B/25/04 |
| JP | 61264547 | | 11/1986 | |
| JP | 4278253 | | 10/1992 | |
| JP | 05217135 A | * | 8/1993 | ............ G11B/5/49 |
| JP | 06084255 | | 3/1994 | |
| JP | 07110995 A | * | 4/1995 | ......... G11B/17/028 |
| JP | 7153157 | | 6/1995 | |
| JP | 09147479 | | 6/1997 | |
| JP | 09320158 A | * | 12/1997 | ......... G11B/17/028 |
| JP | 10070872 A | * | 3/1998 | .......... H02K/29/00 |
| JP | 10092070 A | * | 4/1998 | ......... G11B/17/028 |
| JP | 10208376 A | * | 8/1998 | ........... G11B/19/20 |
| JP | 11213498 A | * | 8/1999 | ......... G11B/17/028 |

* cited by examiner

Primary Examiner—William Klimowicz
(74) Attorney, Agent, or Firm—Stevens, Davis, Miller & Mosher, LLP

(57) ABSTRACT

A medium attaching device for attaching and holding a disk to and releasing the disk from a turntable of a disk device. A plurality of holding/releasing devices are arranged radially around a center hub of the turntable. Each holding/releasing device includes a clamp member of generally crescent form having a holding section and a releasing section located on opposite sides with respect to a swivel center. When the disk is transferred to a predetermined position of the disk device, the clamp members are swiveled around the swivel center to either attach and hold the disk to the turntable, or raise the disk to a position above the turntable and hence to release the disk therefrom.

5 Claims, 17 Drawing Sheets

MEDIUM ATTACHING DEVICE AND DISK DRIVE APPARATUS

BACKGROUND OF THE INVENTION

1. Field of the Invention

The present invention relates to a mechanism or device for holding a disk-like information recording medium in a rotationally driving apparatus. The disk information recording medium includes a disk medium, such as an MO, PD, CD, CD-ROM, CD-R, CD-RW, DVD-ROM, DVD-R, DVD-RW, DVD-RAM, for optically reproducing and recording information, and is simply referred to as "disk" herein. Apparatuses for reproducing information from and recording information on such a disk, including a CD-ROM drive and DVD drive, are herein referred to as "disk drive apparatus". In particular, the invention relates to a mechanism used in a disk drive apparatus for clamping a disk on a turntable.

2. Description of the Related Art

In recent years, disk drive apparatuses have become increasingly small and thin and are incorporated in thin portable personal computers. As the disk drive apparatuses are downsized, more and more small, thin notebook computers contain such disk drive apparatuses. In addition, the volume of software used in computers and the number of inexpensive CD-ROMs distributed as media attached to magazines are also increased. These factors also necessitate the inclusion of the disk drive apparatus in the computer.

A clamp mechanism of a conventional disk drive apparatus will be described below. The following three systems have been conventionally used.

One is a disk-self-insert/eject (clamp) system in which a user holds a disk and directly places it on a turntable, which is a component of an optical pickup unit.

A second one is a tray system. In this system, a tray is ejected from a disk drive apparatus, a disk is placed on the tray, the tray is retracted into the apparatus, and then the disk is lowered onto a turntable or the entire pickup unit rises to place the disk on the turntable. Then, a cylindrical member called "clamper" holds the disk to the turntable from the topside thereof with magnetic attraction.

A third one is a system in which a disk contained in a disk case called "caddy" is inserted into a disk drive apparatus. The disk is held on a turntable by a clamp member provided on the top of the caddy, with the aid of an attractive force of a magnet provided in the turntable.

A new system called "slot loading" has been proposed. In this system, when a disk is inserted into a certain position of a disk drive apparatus through a slit called "front bezel" formed in the front panel of the disk drive apparatus, the disk is automatically retracted onto a turntable in the apparatus. This system is easy to operate, highly dust-resistant because of its small disk outlet, and unsusceptible to harmful effect such as static electricity from a human body. This system is used in an on-vehicle CD player, MD player, and portable MD device.

However, such system is not widely used in other applications such as home audio or CD-ROM drive apparatuses. Because, in order to adopt the slot loading system, the apparatus needs to have a space for retracting a disk. That is, if the slot loading system is realized by using the same clamp mechanism as that used in a conventional disk drive apparatus, the thickness of the entire disk drive apparatus increases by an amount or size of the above-described space.

The industrial standard thickness of a disk drive apparatus contained in a small, thin notebook computer is 12.7 mm. Therefore, implementing a slot-loading disk apparatus requires a completely new medium attaching device.

An object of the present invention is to provide a medium attaching device capable of holding a disk with a considerably thin thickness as compared with the prior-art device.

It is another object of the invention to provide a slot-loading disk drive apparatus using such medium attaching device and having a thickness of 12.7 mm or less.

SUMMARY OF THE INVENTION

A clamp mechanism according to the invention is thin and capable of automatically holding a disk when the disk is placed in a disk drive apparatus. The clamp mechanism is incorporated in a spindle motor of the disk drive apparatus to realize an ultra-thin slot-loading disk drive apparatus having a thickness of 12.7 mm, which is a typical thickness of the predominant CD-ROM drive apparatus incorporated in recent notebook computers.

DESCRIPTION OF THE PREFERRED EMBODIMENTS (First Embodiment)

Figure 1:
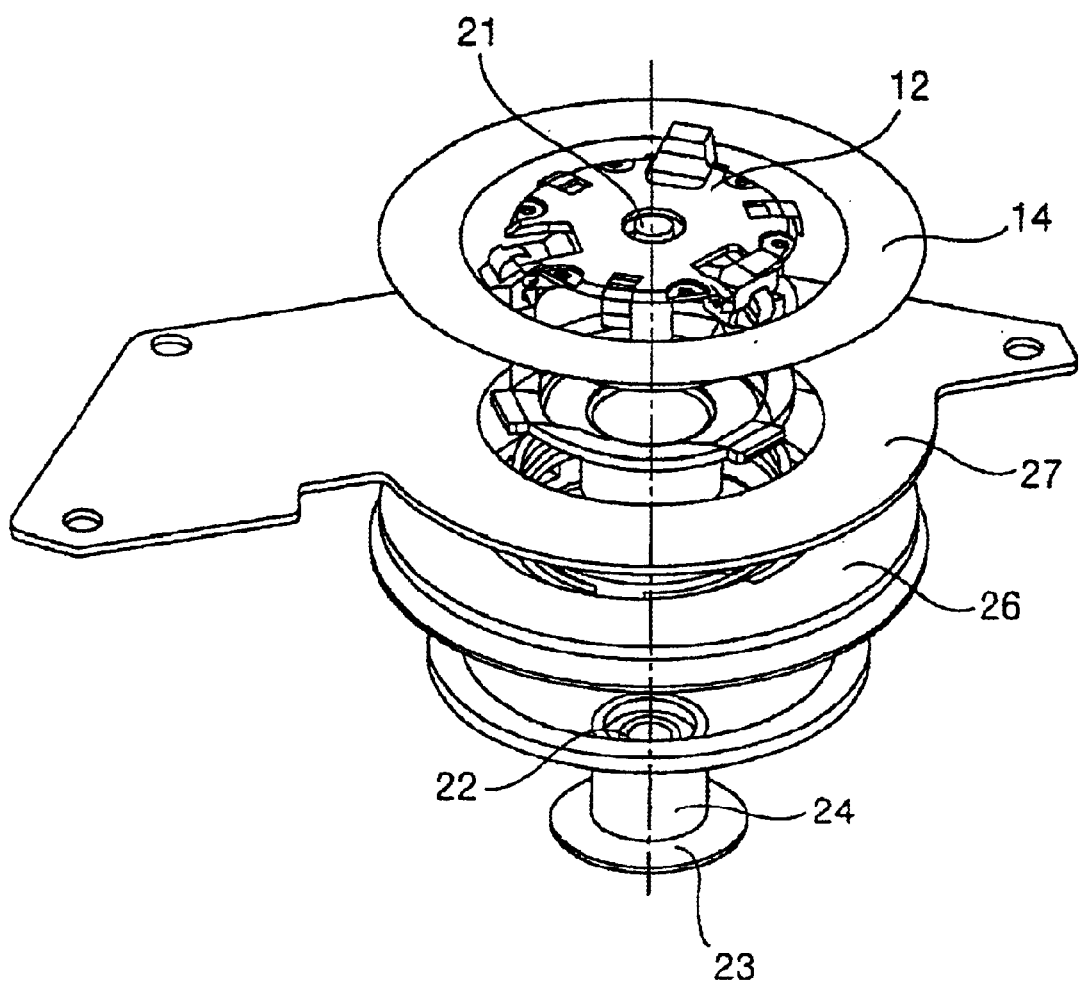
FIG. 1 is an exploded perspective view of a medium attaching device according to a first embodiment of the invention.
Figure 2:
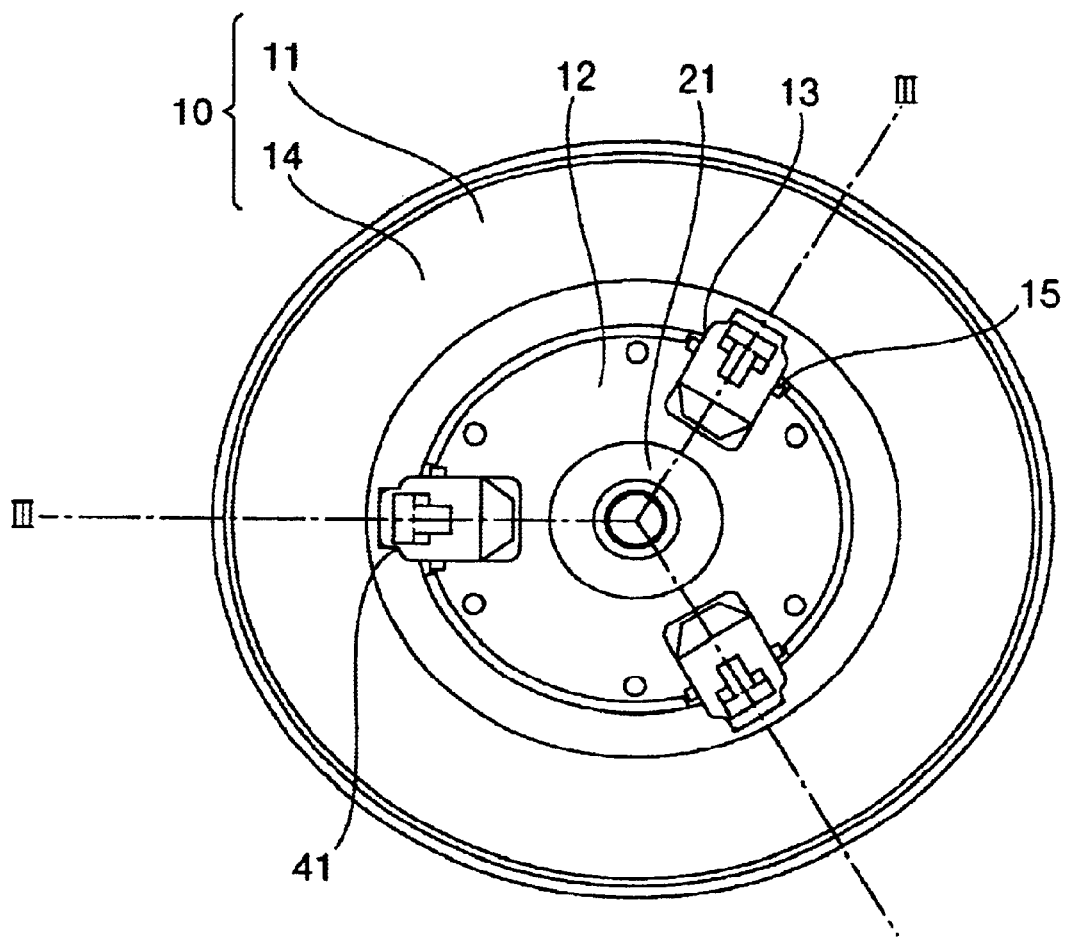
FIG. 2 is a plan view of a turntable shown in FIG. 1.
Figure 3:
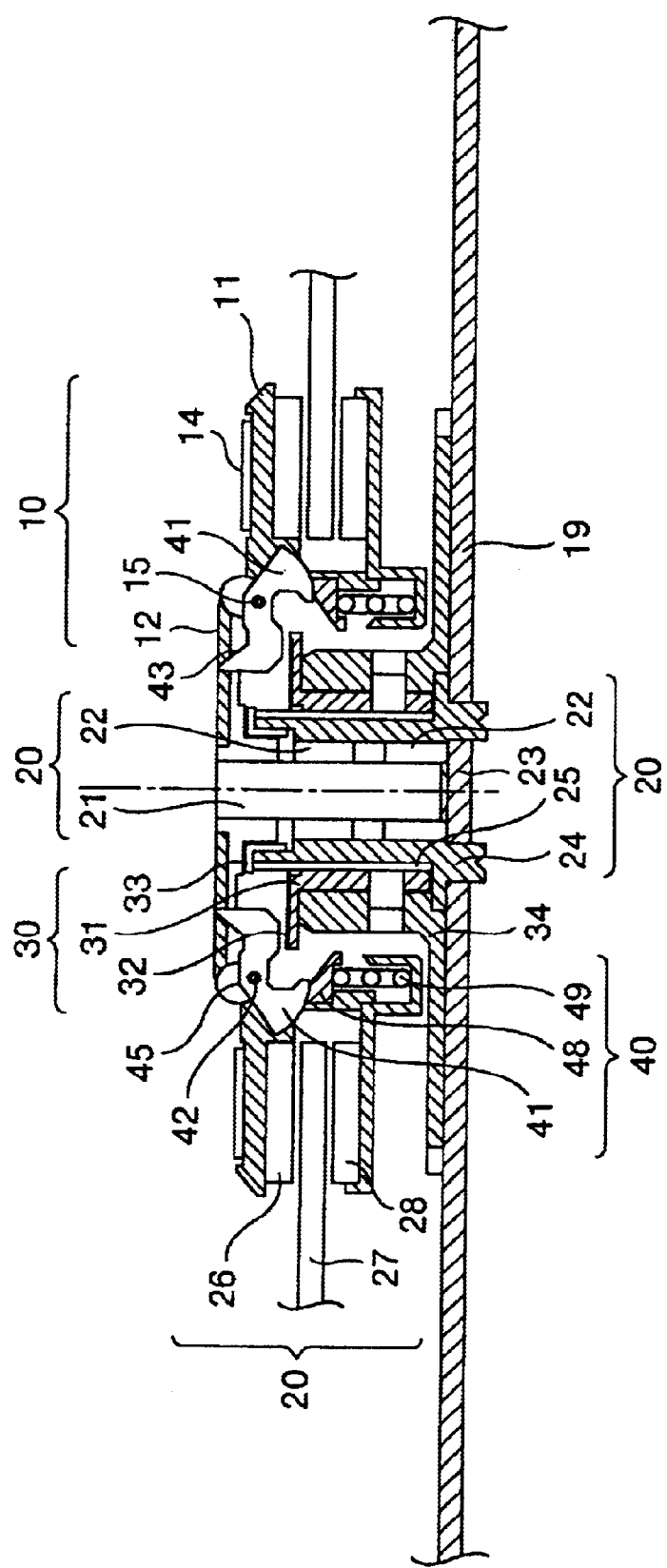
FIG. 3 is a cross-sectional view taken along the line III—III of FIG. 2.
Figure 4:
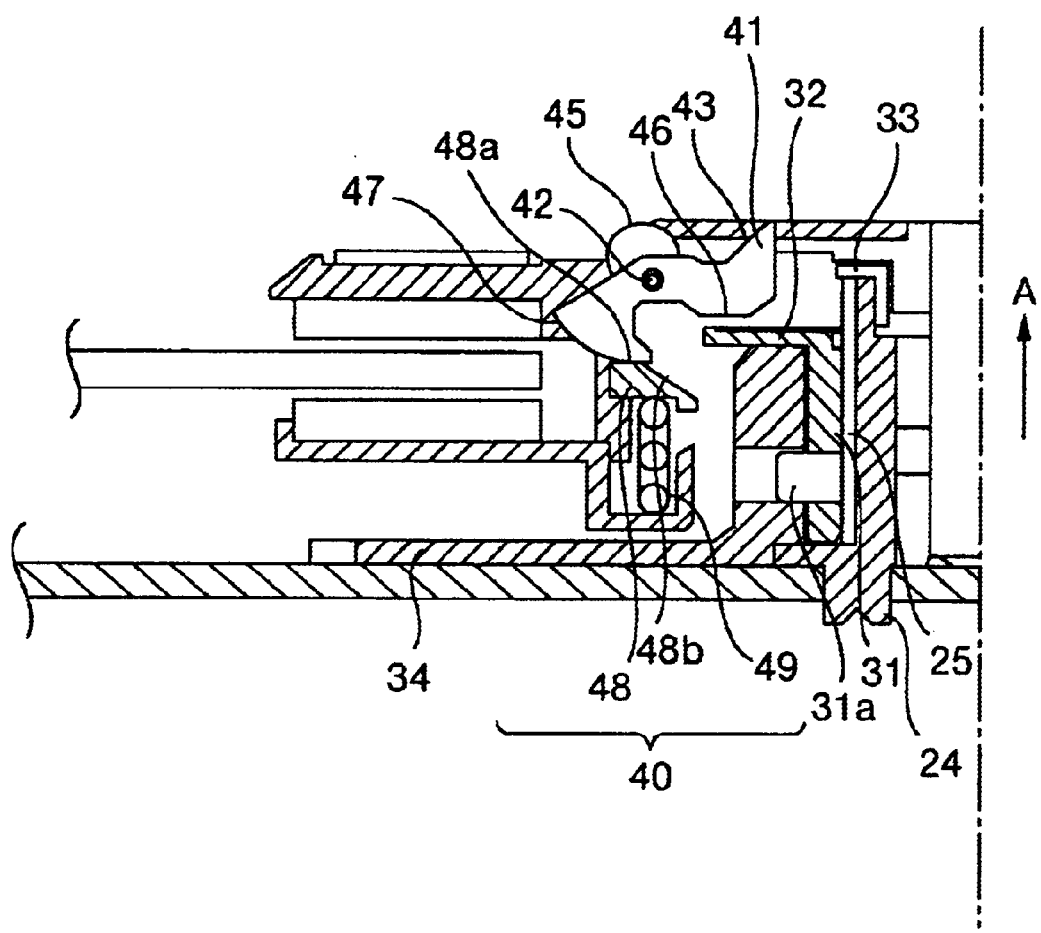
FIG. 4 is an enlarged view of a main part of the turntable shown in FIG. 3.

A first embodiment of the present invention will be described below with reference to the accompanying drawings. FIG. 1 shows an exploded perspective view of a medium attaching device according to the present invention. FIG. 2 is a plan view of a turntable shown in FIG. 1. FIG. 3 is a cross-sectional view taken along the line III—III of FIG. 2. FIG. 4 is an enlarged view of a main part of the turntable shown in FIG. 3. Rotary platform means 10 in FIGS. 1 through 4 comprises a turntable 11 on which a disk is to be placed and a center hub 12 on which a central hole of the disk is to be fitted. The turntable 11 is made of plated free-cutting steel processed with a precision of an out-of-roundness of 10 micrometers by using an NC lathe or the like, and rotated by rotating means or device 20. The center hub 12 is formed protrudently at the center of the turntable 11. The protruded surface of the center hub 12 is tapered into a slant. The center hub 12 fits into the center hole formed in the center of the disk to align the center of the disk with the central axis of a shaft 21.

The height of the protrusion of the center hub 12 is restricted to equal to or less than the thickness of the disk loaded on the turntable 1. Formed radially are clamper holes 13, each of which receive a clamp member 41 described later in detail and through which the clamp member 41 projects. Reference numeral 14 denotes a slip sheet provided for increasing sliding friction to cause the disk 1 to follow acceleration and deceleration of the turntable 11. The rotary platform means 10 is fitted on the shaft of the rotating means 20. The rotating means 20 is constituted from a spindle motor.

The shaft 21 is made of a material (such as stainless steel SUS420J2) having a high hardness and realizing a high profile regularity for enabling to rotate at high speed. A pillow block or a support tube 22 is positioned on the outer periphery of the shaft 21. The shaft 21 is rotatably supported by the pillow block 22 with a clearance of several micrometers. The pillow block 22 is typically made of a sintered metal in consideration of costs. In some special cases where high performance is required, a bearing may be used.

A thrust block or a thrust bearing 23 receives a thrust load of the shaft 21. The thrust block 23 is made of a metal or resin such as a high strength resin, PPS, that has high strength and improved slidability. The pillow block 22 is disposed inside a bearing housing 24. That is, the pillow block 22 is press-fitted into the bearing housing 24 and the thrust block 23 is attached to the bearing housing 24. The bearing housing 24 is typically made of BsBM (brass). The bearing housing 24 is fixed on a base 19. The base 19 may be made of a magnetic material such as SECE.

Reference numeral 25 denotes an inner sleeve. The inner sleeve 25 is attached to the outer periphery of the housing 24 by press fitting or other methods. The inner sleeve is made of a resin, such as POM, that has high slidability.

The spindle motor 20 has a plane-opposed (axial-gap) DC brushless motor structure. A rotor magnet 26 is attached to the outer periphery of the turntable 11. The rotor magnet 26 is approximately 0.5 to 2 mm thick and polarized into a plurality (8 or 12, or any number) of N/S poles. A PCB (printed circuit board) 27 is arranged at a predetermined distance from the rotor magnet 26. A plurality of print coils, which are layered by etching, are provided on the PCB 27 and function as stator coils. The PCB 27 is approximately 1 mm thick for realizing a thin motor.

A lower rotor 28 is arranged at a predetermined distance from the PCB 27. The lower rotor 28 is made of a ferromagnet, forms a rotor yoke, sandwiches the stator coils of the PCB 27, and generates an electromagnetic driving force for the spindle motor 20. The turntable 11 is integrated with the rotor magnet 26 constituting a magnetic circuit of the motor. Thus, the thickness and the number of components of the apparatus are reduced.

Reciprocating means or device 30 will be described hereunder, which is a driving mechanism for swiveling or swinging a clamp member 41. According to the first embodiment, a driving source such as a DC motor is disposed outside the rotating means (spindle motor) 20 and its driving force is transmitted to the reciprocating means 30 provided in the spindle motor through a gear train. Reference numeral 31 in FIG. 3 denotes a slider, which slides in the direction of the axis of the shaft 21 along the outer periphery of the inner sleeve 25 attached to the outer periphery of the bearing housing 24. The slider 31 is made of a light and rigid material such as aluminum. The inner sleeve 25 is made of a resin such as POM that has adequate slidability to slide on the inner periphery of the slider 31. In addition, a flange 32 is provided on an end face of the slider 31 located near the turntable 11. The flange 32 may be integrated with the slider 31 if it does not adversely affect the fabrication.

The outer peripheral portion of the flange 32 abuts against the clamp member 41 and provides a torque for driving the clamp member 41. Reference numeral 33 denotes a stopper, which restricts the position to which the slider 31 is allowed to rise and prevents the flange 32 from contacting the clamp member 41 or the center hub 12 when a disk is held or fixed.

Figure 5:
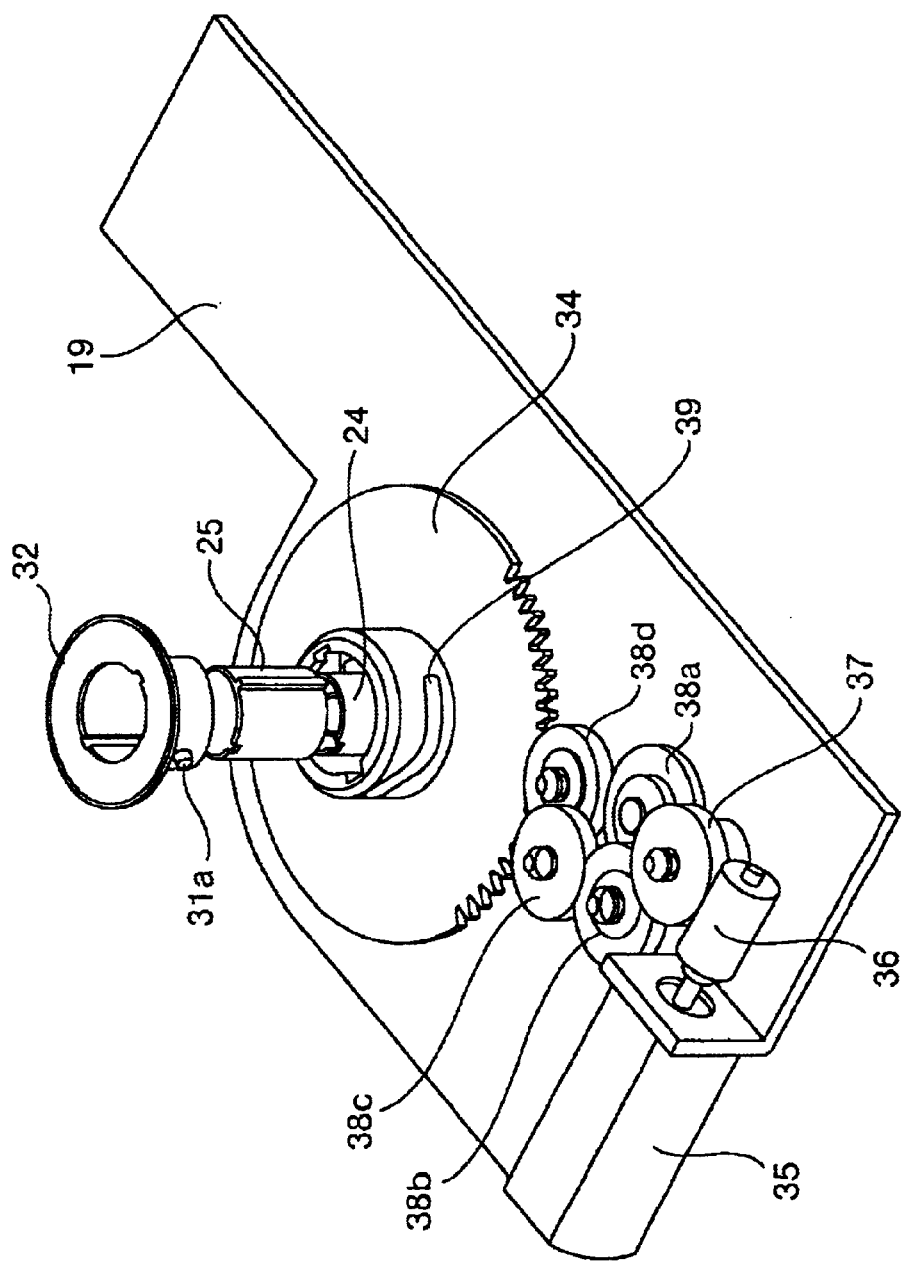
FIG. 5 is a perspective view for illustrating the drive mechanism of a slider drive cam.

FIG. 5 is a perspective view for explaining a driving mechanism for a slider driving cam. Reference numeral 34 in FIG. 5 denotes a slider driving cam. The slider driving cam 34 constitutes rotating or rotational transfer means including a cylindrical section and a spur-geared driving section. The cylindrical section is mounted on the outer periphery of the slider 31. The driving section extends from the cylindrical section like a flange and is positioned along the base 19. A pin 31a projecting from the outer periphery of the slider 31 is inserted into and engaged in a cam groove 39 formed in a spiral fashion in the cylindrical wall of the cylindrical section of the driving cam. Thus, the slider 31 is moved up and down coaxially with the shaft 21 by rotating the slider driving cam 34.

Reference numeral 35 denotes a DC motor constituting a source of a driving force for driving the slider driving cam 34. Reference numeral 36 denotes a worm for transmitting the force of the DC motor 35 to a worm wheel 37. Reference numerals 38a through 38d denote gears or a gear train for reducing the number of revolutions to an appropriate number and enhancing the driving force during transmission of the force from the DC motor 35 to the slider driving cam 34.

With the structure described above, when an electricity is supplied to the DC motor 35, the gear train rotates and the driving force is transmitted to the slider driving cam 34. Thus, the slider 31 is moved up and down coaxially with the shaft 21 along the outer periphery of the inner sleeve 25, and the flange 32 applies a torque to the clamp member 41.

Holding/releasing means or device 40 including the clamp member 41 will be described below. Referring again to FIGS. 3 and 4, a swivel shaft or a pivot shaft 15 is provided on the inner side of each clamper hole 13 of the turntable 11 and engages with and is locked on the edge of the swivel center hole 42 of the clamp member 41. The clamp member 41 has the function of holding or fixing the disk 1 and is formed with a holding section 43 that engages an edge of the clamper hole 13. The clamp member 41 is also formed with a releasing section 45. The releasing section 45 has the function of releasing the disk 1 from the center hub 12 and raising the disk 1 to a position (which will be described later as "disk-release position") at which the surface of the disk is raised to a position above the upper plane of the center hub 12. The clamp member 41 is adapted to swivel or swing to hold or release the disk 1. Thus, the holding section 43 and releasing section 45 are provided on the opposite sides with respect to the swivel center hole 42. The clamp member 41 therefore is formed in generally crescent form.

The swivel shaft 15 is attached to the rear side (inner side) of the turntable 11 by means of a swivel shaft presser member 16. The swivel shaft presser member 16 includes a pair of fixing projections 44, which are inserted into swivel shaft presser member holes 17 in the turntable 11. Six swivel shaft presser member holding spaces 18 are provided in the center hub 12. Adhesive is poured into these spaces or the swivel shaft presser member fixing projections 44 are welded to the turntable 11 by applying heat, to fix the swivel shaft presser member to the turntable 11.

The clamp member 41 abuts against the flange 32, which actuates or initiates swiveling. An abutting surface 46 is provided at the abutting position so as to enable to efficiently effect or actuate the swiveling movement. A cam surface 47 is formed to make the swiveling movement continued without relying on the thrust of the slider 31 once swiveling is initiated. An abutting surface of a pressure plate 48 against the cam surface 47 has a flat surface section 48a and an inclined surface section 48b. The pressure plate 48 abuts against the cam surface 47 to produce a pressure force. Since an abutting angle exists between the pressure plate 48 and the cam surface, a torque is generated.

The pressure plate 48 is pressed and forced in the direction indicated by an arrow A by a clamp spring 49, which is a compression coil spring. The clamp spring 49 is provided between the pressure plate 48 and the underside or rear side of the turntable 11. As illustrated in FIG. 1, three clamp members 41 are provided on the turntable 11. These clamp members 41 are evenly spaced and concentric with the shaft 21. Of course, the number of the clamp members 41 is not limited to three. The number of the clamp members may be four, six, or any number that is appropriately chosen in accordance with the diameter of the central hole 2 and pressure holding force.

Figure 6A:
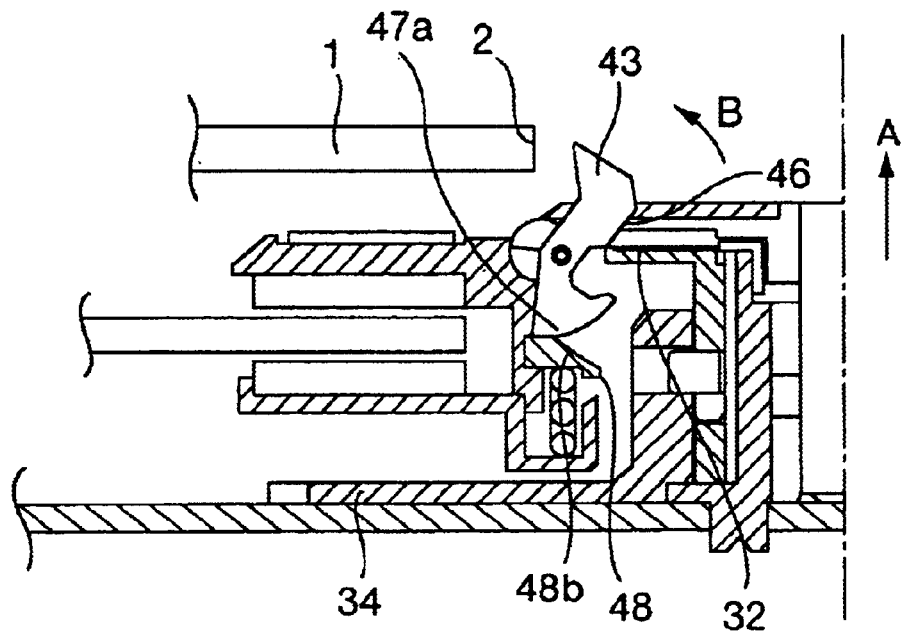
FIGS. 6A and 6B are views similar to FIG. 4, illustrating a swiveling movement in a holding direction.
Figure 6B:
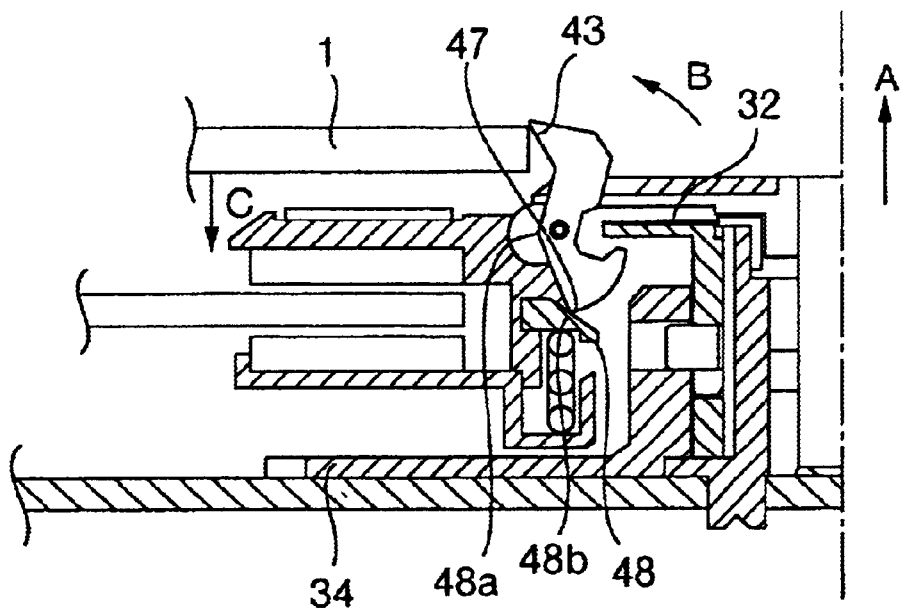
Figure 7A:
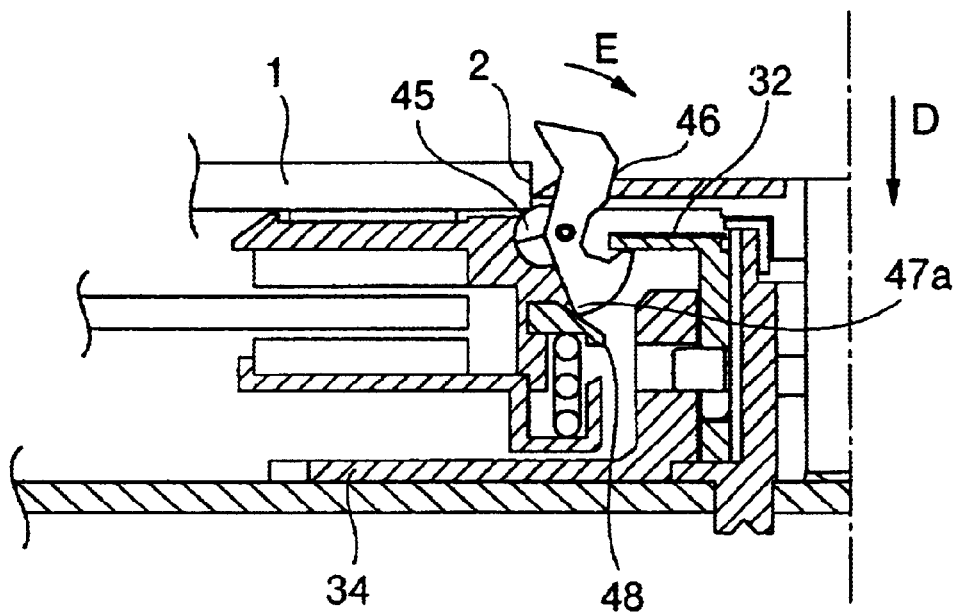
FIGS. 7A and 7B are views similar to FIG. 4, illustrating a swiveling movement in a releasing direction.
Figure 7B:
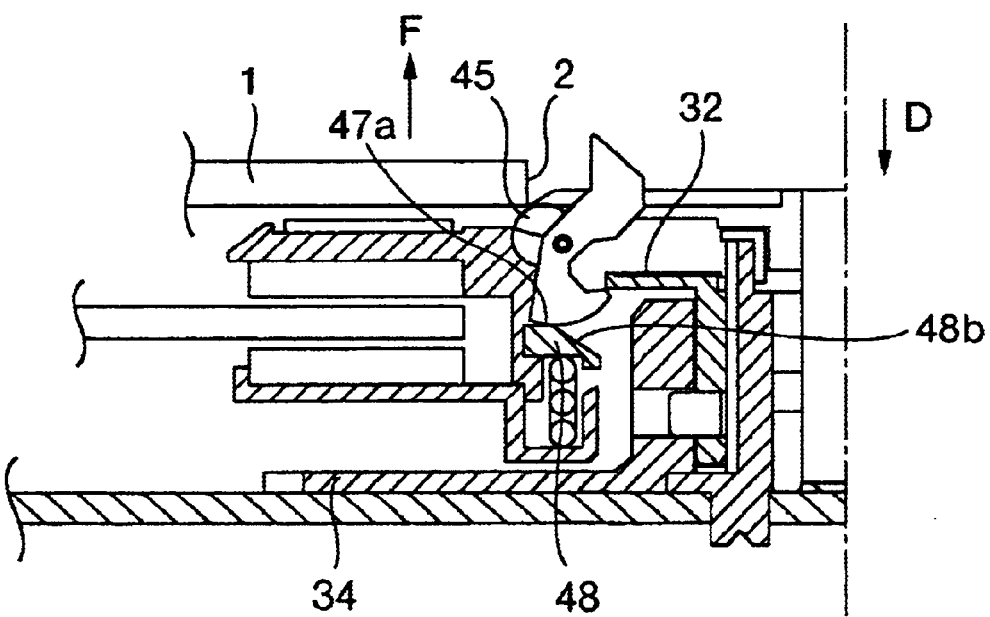

Actuation (or initiation) and continuation of the above-described swiveling movement will be described below. FIG. 6 illustrates swiveling movement in a holding or fixing direction. FIG. 6A shows a moment at which a swiveling dead point 47a in the holding direction is passed by and FIG. 6B shows a state in which the swiveling movement continues toward a holding position. FIG. 7 illustrates swiveling movement in a releasing direction. FIG. 7A shows a moment at which swiveling starts and the swiveling dead point 47a is passed by and FIG. 7B shows a state in which the swiveling continues toward a releasing position.

First, the actuation or initiation of swiveling in the holding direction will be described with reference to FIG. 6A. The flange 32 (slider 31) starts to move in a direction indicated by the arrow A. The abutting surface 46 is pressed by the flange 32 to cause the clamp member 41 to start swiveling in a direction indicated by an arrow B. The slider 31 continues to move in the direction indicated by the arrow A and the swiveling dead point 47a passes the flat surface section 48a while effecting the swiveling. The cam surface section 47 of the clamp member 41 has a swiveling dead point 47a according to its rotation angle and the position of the abutting surface of the cam surface section 47 against the pressure plate 48. When the clamp member 41 passes the swiveling dead point 47a and is pressed by the pressure plate 48, the clamp member 41 swivels in the direction indicated by the arrow B. The term, "swiveling dead point 47a", may be defined as follows. Assume a line of action which extends in a direction in which the pressure plate 48 is pressed by the spring 49 and passes the swivel center hole 42. There is the moment at which the contact point between the cam surface section 47 and the pressure plate 48 is positioned on or registered with the above-described line of action. The swiveling dead point 47a is the contact point at such moment. In other words, the swiveling dead point 47a is the neutral point at which a moment of rotation is not produced.

After the clamp member 41 passes the swiveling dead point 47a, the state changes to the sate shown in FIG. 6B, where the cam surface section 47 is further pressed by the inclined surface section 48b in the direction indicated by the arrow A. At this time, the contact point between the cam surface section 47 and the pressure plate 48 has passed the swiveling dead point 47a and the torque for swiveling the clamp member in the direction B is produced. As a result, the clamp member 41 continues to swivel in the direction B by the force of the pressure plate 48 without the aid of the thrust of the flange 32, and the holding section 43 draws or moves the central hole 2 of the disk 1 in a direction C (holding direction). The disk medium is thus held or fixed and information is recorded on or reproduced from the disk medium. The optical parts are movable in a radial direction by reciprocating means for the optical parts.

After completion of the recording or reproduction, the disk medium is ejected from the disk drive apparatus. Actuation or operation in the releasing direction will be described below with reference to FIG. 7A. The slider 31 starts to move in a direction indicated by an arrow D. The abutting surface 46 is pressed by the flange 32 of the slider 31 to cause the clamp member 41 to start swiveling in a direction indicated by an arrow E. The slider 31 continues to move in the direction indicated by the arrow D. Eventually, the swiveling dead point 47a passes the flat surface section 48a while swiveling. At this stage, the swiveling dead point 47a functions similarly to the case of the swiveling in the holding direction described hereinabove, though the direction of swiveling movement is different from each other.

Next, the state changes to the state shown in FIG. 7B. The cam surface section 47 is further pushed by the flat surface section 48a in the direction (direction A) opposite to the direction D. Here, the contact point of the cam surface section 47 with the pressure plate 48 passes the swiveling dead point 47a to generate torque that swivels the clamp member 41 in a direction E. As a result, the clamp member 41 continues to swivel in the direction E by the forth of the pressure plate 48 without aid of the thrust of the flange 32 and the releasing section 45 raises the disk 1 in the direction F (releasing direction). The clamp member 41 further swivels in the direction E and the holding section 43 swivels in a direction in which it is detached from the clamp hole 2 and is retracted into the center hub 12. The releasing section 45 rises to the position of the upper plane or surface of the center hub 12 and the surface of the disk is raised to a position above the upper plane of the center hub 12.

During the holding operation described above, the contact point between the cam surface section 47 and the inclined surface section 48b is located on the inner-periphery side of the turntable with respect to the swivel center hole 42. Thus, the clamp member 41 is forced to swivel in the holding direction (direction B) by forcing means including the pressure plate 48 and clamp spring 49. During the releasing operation, the contact point between the cam surface section 47 and flat surface section 48a is located on the outer-periphery side of the turntable with respect to the swivel center hole 42. Thus, the clamp member 41 is pressed by the forcing means including the pressure plate 48 and clamp spring 49 to swivel in the releasing direction (direction E). The forcing means including the pressure plate 48 and clamp spring 49 thus-assists the function of the flange 32 to swivel the clamp member 41. In other words, the forcing means assists the function or movement of the clamp member 41 to take the holding position and the releasing position.

In the first embodiment, a DC motor is used as the reciprocating means 30 and it is incorporated into the spindle motor. However, means for swiveling the holding/releasing means is not limited to such reciprocating means. For example, instead of the DC motor, a cylindrical solenoid or a micro-solenoid may be incorporated into the center hub. Further, a magnet and a coil may be incorporated into the holding/releasing means and the clamp hole so as to directly swivel the holding/releasing means. The reciprocating means has been illustrated and described as an example of the means for swiveling the holding/releasing means. The swiveling means may be constituted from the reciprocating means and the above-described alternative means. The detailed description on the other alternative means is eliminated since it is not the subject of the invention.

(Second Embodiment)

Figure 8:
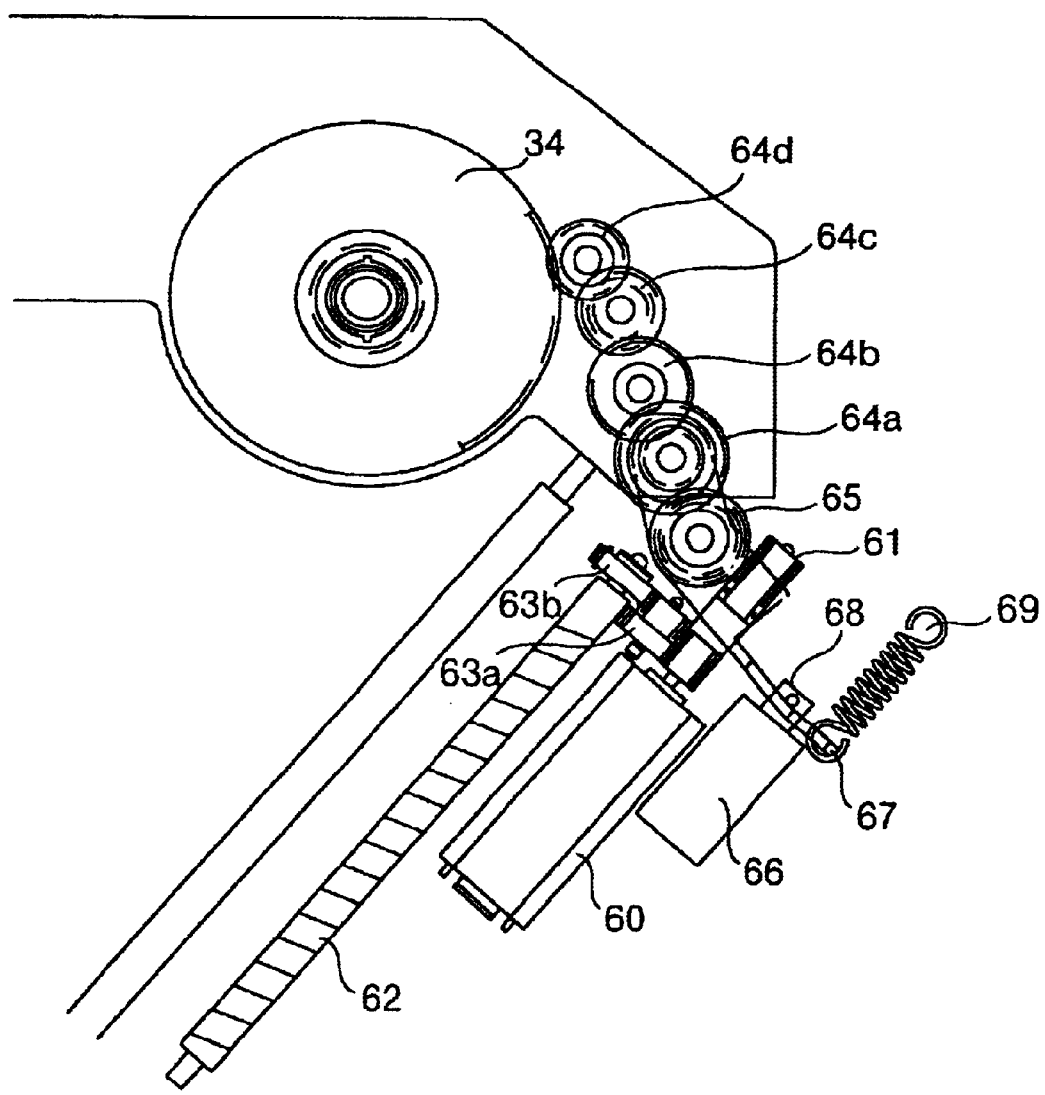
FIG. 8 is an enlarged view of a main part of a second embodiment of the invention, which includes optical part moving means.
Figure 9:
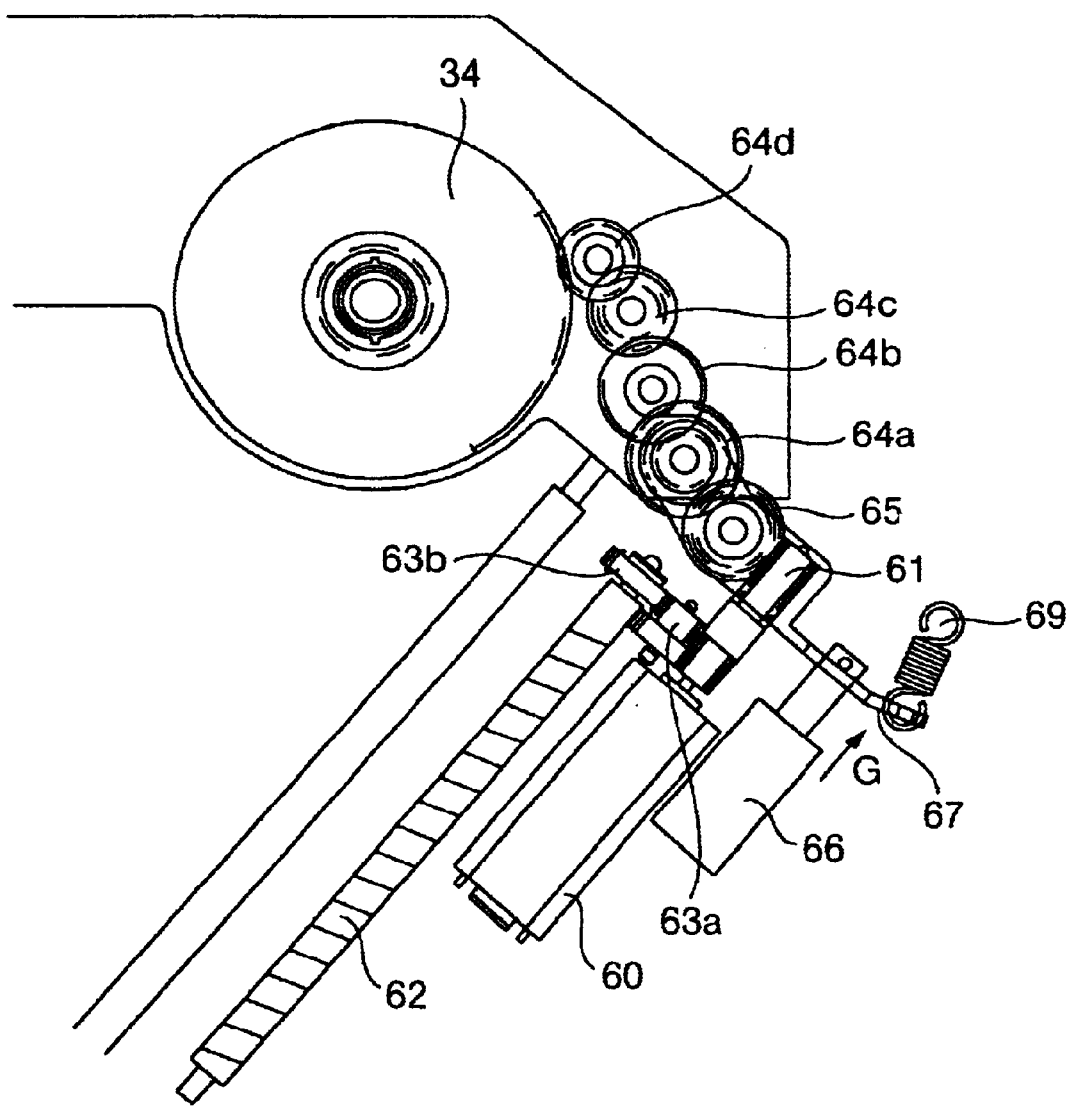
FIG. 9 is a view similar to FIG. 8, illustrating the state in which a compound gear engages a worm wheel.

A second embodiment will be described below in which a part of optical part reciprocating means for reading information from a disk medium is used as a driving power source for a slider driving cam 34. FIG. 8 is an enlarged view of a main part of the second embodiment, which includes optical part moving means. FIG. 9 shows the state in which a compound gear is engaged with a worm wheel. Reference numeral 60 denotes a DC motor, which constitutes s driving power source for an optical part platform reciprocating means. Reference numeral 61 denotes a compound gear for transmitting a force from the DC motor 60 to each gear train. The compound gear 61 includes a normal gear at its root-side portion located near the DC motor 60 and a worm at its tip portion remote from the DC motor. Reference numeral 62 denotes a screw gear for transferring or moving the platform. Reference numerals 63a and 63b denote gears for transmitting a force output from the DC motor 60 to the screw gear 62. Reference numeral 65 denotes a worm wheel for transmitting a force from the worm at the tip portion of the compound gear 61. The gear 65 includes upper and lower parts. The lower part is a worm wheel for transmitting the force from the compound gear 61, and the upper part is a normal spur gear. Reference numeral 66 denotes an electromagnetic actuator of the self-holding type for effecting switching between a position in which the compound gear 61 is engaged with the worm wheel 65 and another position in which the compound gear 61 is not engaged with the worm wheel 65. Reference numeral 67 denotes a worm wheel base for supporting the worm wheel 65.

In the second embodiment, normally, the electromagnetic actuator 66 presses the worm wheel base 67 against a force of a spring 69 for preventing the teeth of the compound gear 61 from engaging the teeth of the worm wheel 65 (FIG. 8). When an electricity is supplied to the electromagnetic actuator 66, a plunger 68 of the electromagnetic actuator 66 is drawn out by the force of the spring 69. As a result, the worm wheel base 67 moves in a direction G in FIG. 9.

In such manner, the worm wheel 65 is brought into engagement with the worm at the tip portion of the compound gear 61 (FIG. 9). Thus, a power is transmitted from the DC motor 60 to the worm wheel 65, in turn to a train of gears 64a through 64d, and in turn to the slider driving cam 34. By such transmission of the power, a slider 31 is moved up and down along the outer periphery of the inner sleeve 25 coaxially with a shaft 21 and the flange 32 applies a torque to the clamp member 41. The compound gear 61, electromagnetic actuator 66, train of gears 64a through 64d, and worm wheel 65 constitute off and on or make-and-break driving means. The subsequent clamping operation is the same as that of the first embodiment.

(Third Embodiment)

Figure 10:
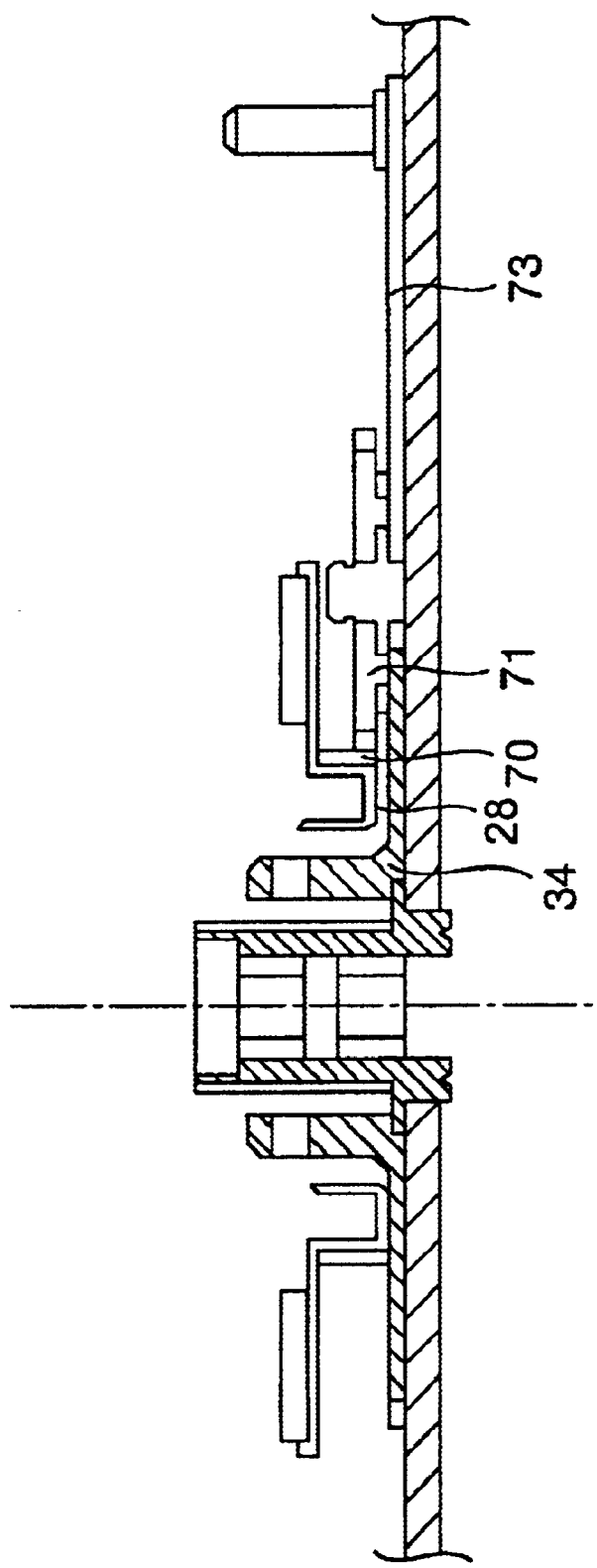
FIG. 10 is a view for explaining a third embodiment of the invention, which includes another drive mechanism of a slider cam.
Figure 11A:
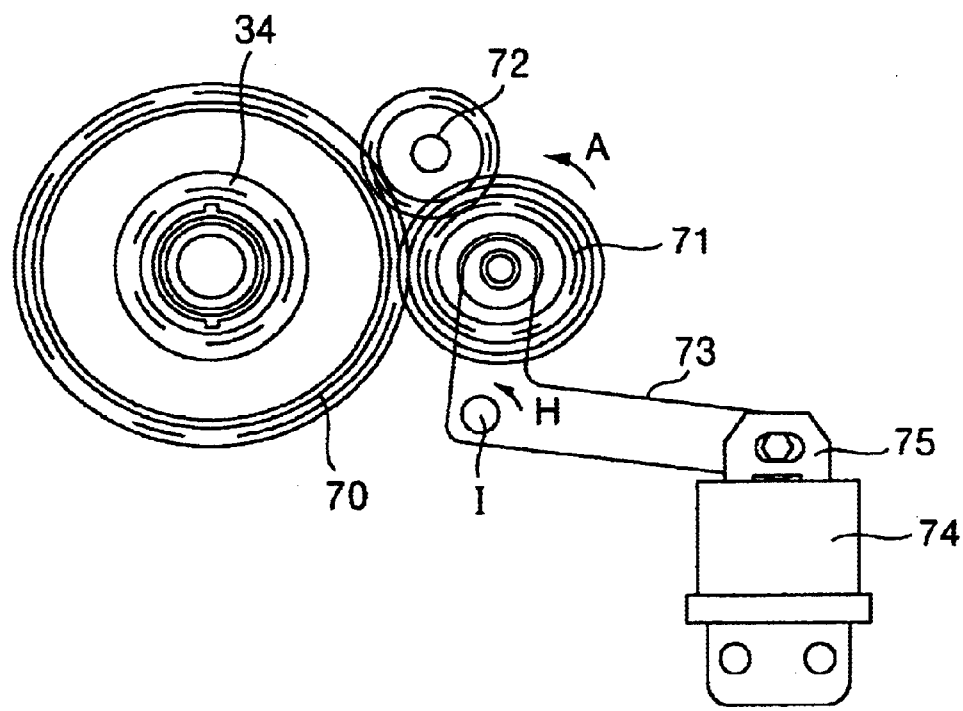
FIGS. 11A and 11B illustrate the state in which a roller gear shown in FIG. 10 is disengaged from a ring.
Figure 11B:
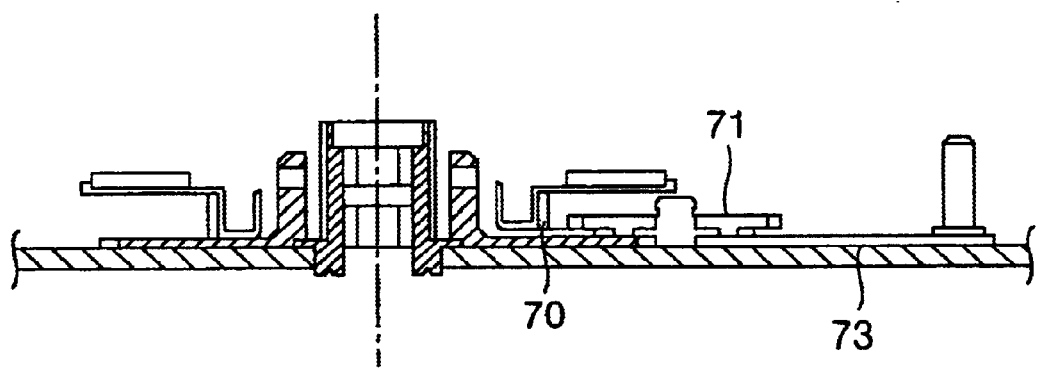
Figure 12A:
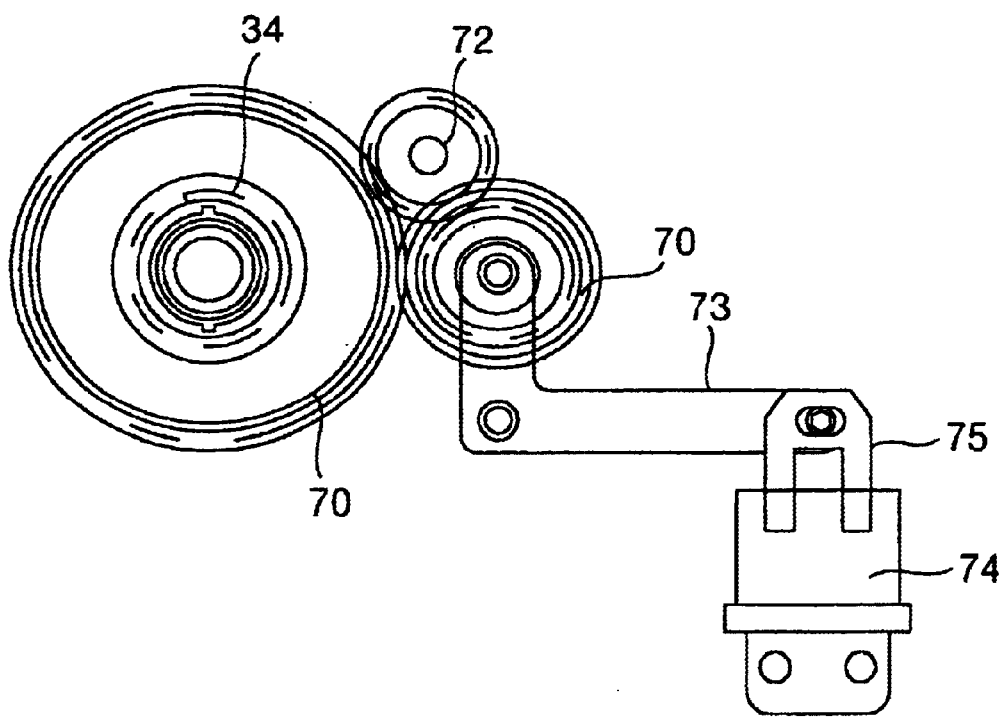
FIGS. 12A and 12B illustrate the state in which the roller gear shown in FIG. 10 engages the ring.
Figure 12B:
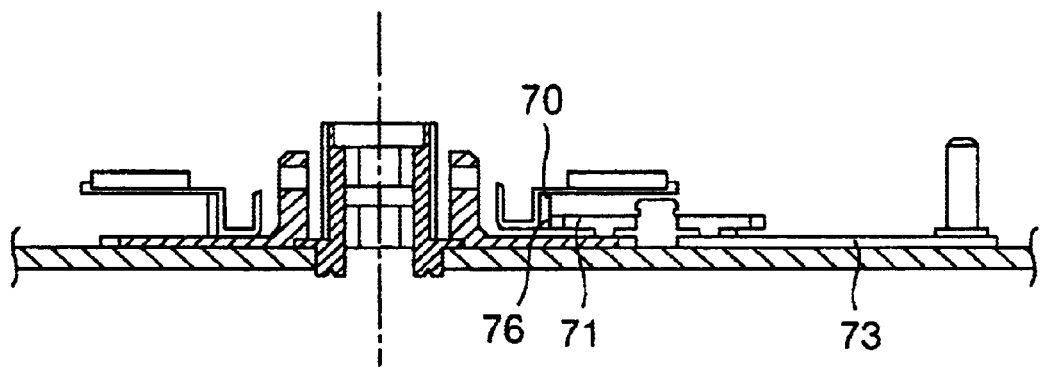

A third embodiment will be described below, in which a spindle motor 20 is used as the driving force source of the slider driving cam 34. FIG. 10 illustrates a driving mechanism for the slider driving cam. FIGS. 11A and 11B show a state in which a roller gear 71 is separated or disengaged from a ring 70. FIGS. 12A and 12B show a state in which the roller gear 71 is brought into engagement with the ring 70. The ring 70 is attached to the outer periphery of a lower rotor 28. The ring 70 is made of a material having a high coefficient of friction such as rubber. The roller gear 71 has a roller at its upper part and a gear at its lower part. The rotation of the spindle motor 20 causes a force to be transmitted from the ring 70 to the roller at the upper part of the roller gear 71 and the gear at the lower part of the roller gear 71 transmits the force to a coupling gear 72.

The force transmitted to the coupling gear 72 is transmitted to the slider driving cam 34 for driving the slider 31. A roller gear plate 73 supports the roller gear 71. An electromagnetic actuator 74 is of the type called push-pull solenoid, and operates to effect switching between on and off of the engagement between the roller gear 71 and the coupling gear 72. A plunger 75 attached to the roller gear plate 73 is attached to the plunger of the electromagnetic actuator 74. The electromagnetic actuator 74 is operated to effect switching between an on-position in which the roller gear 71 is engaged with the coupling gear 72 and an off-position in which the roller gear 71 is disengaged from the coupling gear 72.

With the structure of the third embodiment, normally the plunger 75 of the electromagnetic actuator 74 is attracted by the electromagnetic actuator 74 to cause the roller gear plate 73 to correspondingly rotate or swing, and hence the roller gear 71 is separated or disengaged from the ring 70 (FIG. 11). When the attracting force by the electromagnetic actuator 74 is released or removed, the roller gear plate 73 swivels or swings in a direction H in FIG. 11A around a pivot point "I". Thus, the roller of the roller gear 71 is brought into engagement with the ring 70 as shown in FIG. 12, and the gear at the lower part of the roller gear 71 engages the coupling gear 72.

When the spindle motor 20 is rotated in this state, the ring 70 rotates and the force is transmitted from the ring 70 to the roller gear 71. The force is then transmitted from the gear at the lower part of the roller gear 71 to the coupling gear 72, and in turn to the slider driving cam 34. Thus, the slider 31 is moved up and down along the outer periphery of the inner sleeve 25 coaxially with the shaft 21, and the flange 32 applies a torque to the clamp member 41. The roller gear 71, coupling gear 72, roller gear plate 73, plunger 75 and electromagnetic actuator 74 constitute off and on or make-and-break engaging means. The subsequent clamping operation is the same as that of the first embodiment.

(Fourth Embodiment)

Figure 13:
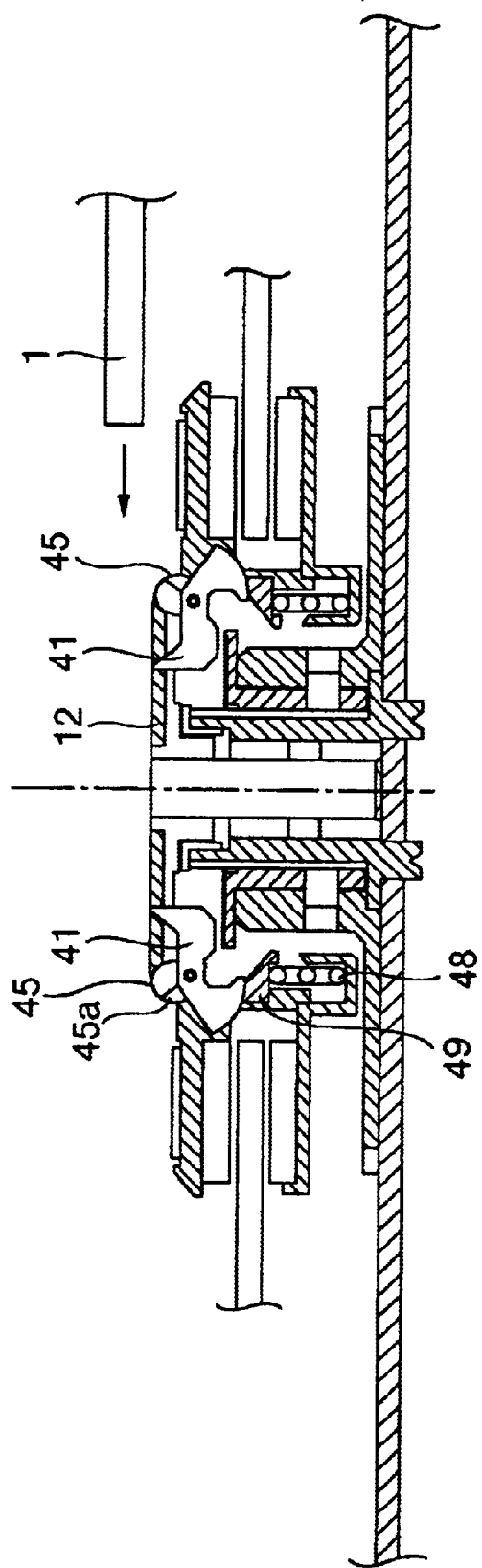
FIG. 13 illustrates the standby state of the disk drive apparatus according to the invention.

The operation of the disk drive apparatus using the holding/releasing means 40 constructed as described above will be described below. FIG. 13 shows the disk drive apparatus according to the invention in a waiting or standby condition. A disk 1 is transferred to the rotary platform means 10 by transfer means (not shown). Here, the holding/releasing means 40 is in the standby condition and the clamp member 41 is contained inside the center hub 12. As shown in the partial view of the clamp member 41 in FIG. 13, the outer periphery of the releasing section 45 may be formed as combined semicircles to provide a releasing inclined section 45a, with a view to reducing resistance and damage to the greatest possible extent.

The transfer means (not shown) transfers a disk 1 from a position at which an operator handles the disk 1 to the rotary platform means 10. It may be the means or device for carrying the disk 1 on a belt, roller and guide by using a carrier. It is unnecessary to transfer the disk in a direction perpendicular to the surface of the disk as in the case of the prior art devices. Any means for transferring the disk in the same direction as the disk surface can fully satisfy the function.

Figure 16:
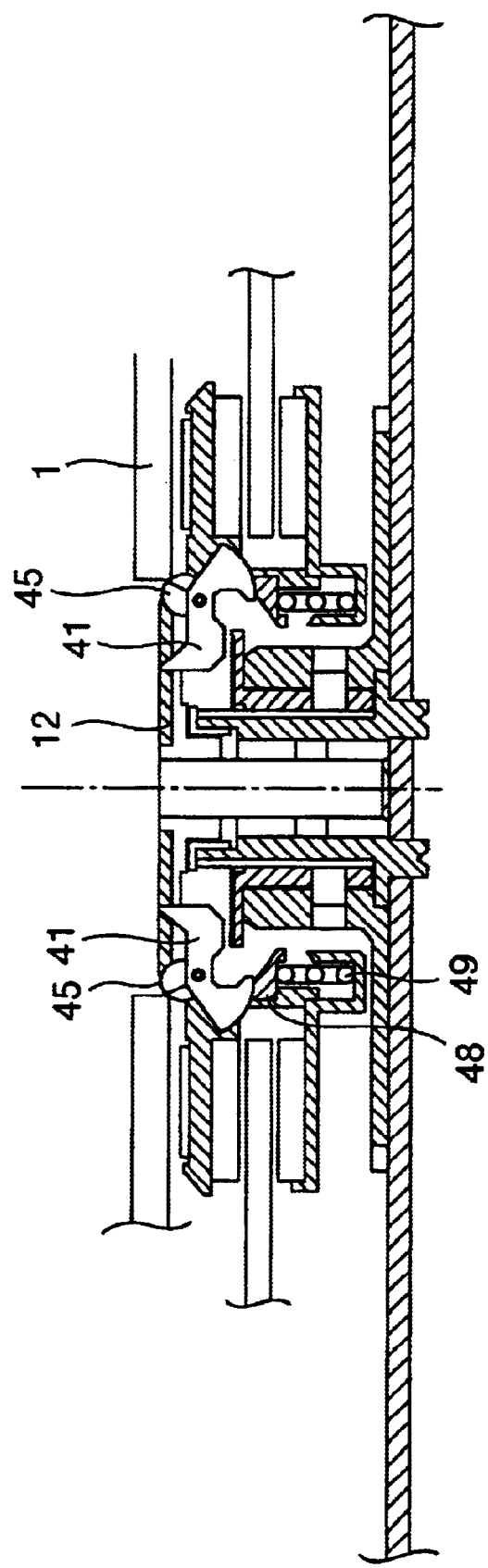
FIG. 16 illustrates the state in which a release operation is completed.

After the transferring operation, the disk 1 has been transferred to a position shown in FIG. 16. FIG. 16 shows a state in which a releasing operation has been completed. In FIG. 16, the center hole 2 is substantially concentric with the center hub 12. After the state of FIG. 16, the holding operation is performed through the states shown in FIGS. 6A and 6B to complete holding of the disk. In such manner, the disk takes a holding position.

Figure 14:
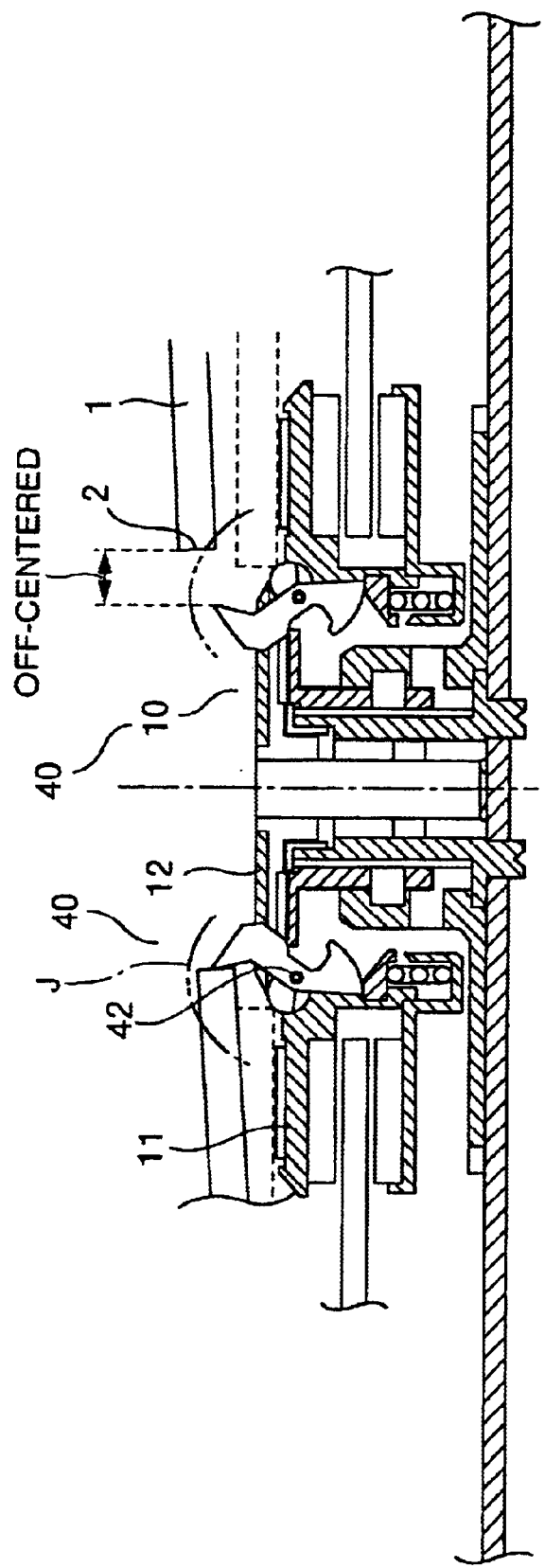
FIG. 14 illustrates a holding operation in the case where a disk is decentered.

FIG. 14 shows a holding operation in the case where a disk is decentered. In FIG. 14, a disk represented by a dotted line is centered, and the disk 1 represented by a solid line is not centered or off-centered and placed in a tilted condition on the turntable 11.

The holding section 43 of the holding/releasing means 40 moves along a path in the shape of a circular arc. In other words, it swivels about a swivel center hole 42 in such a manner as to draw a circular arc trajectory as shown by broken curves J in FIG. 14. Thus, as long as one of the left and right center holes 2 in FIG. 14 is in an inner region of the trajectory J, the holding section 43 catches the center hole 2 and swivels. Thus, the disk 1 is mounted on the center hub 12 in a centered condition, and desirably held in place.

Figure 15:
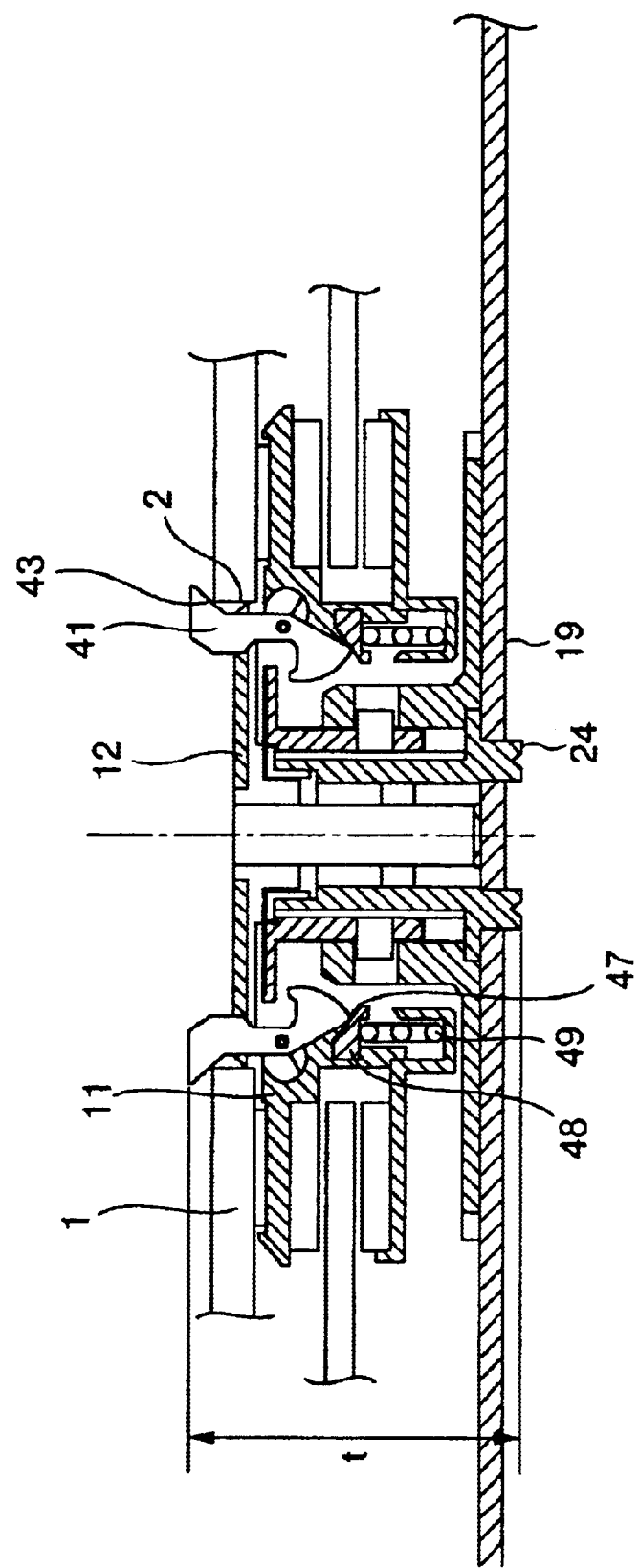
FIG. 15 illustrates the state in which the holding of the disk by a clamp member is completed.

FIG. 15 shows the state after the disk is held by the clamp member. As described with reference to FIG. 6B, the forcing means including the pressure plate 48 and clamp spring 49 assists the clamp member 41 to be kept or maintained in a holding position. Thus, the clamp member 41 can be kept in the holding position even if it is subject to some disturbance such as vibration.

Next, a releasing operation will be described. The releasing operation starts with a state shown in FIG. 15, proceeds to the states of FIGS. 7A and 7B, and then completed. FIG. 16 shows a state in which the releasing operation is completed. The position of the clamp member 41 of FIG. 16 is the same as that shown FIG. 13. In FIG. 16, the disk 1 is released from the center hub 12, raised to a position above the surface of the center hub 12 by the releasing section 45, and remains on standby at a transfer position. That is, the disk 1 waits to be transferred by the transfer means.

Because the holding section 43 is retracted in the center hub 12 as described with reference to FIG. 7B, it does not obstruct the transfer of the disk 1 raised above the plane or surface of the center hub 12. Further, the forcing means including the pressure plate 48 and clamp spring 49 assists the clamp member 41 to take the releasing position. Thus, the clam member 41 can be kept in the releasing position and remains retracted in the center hub 12 even if it is subject to some disturbance such as vibration, and therefore does not obstruct the transfer of the disk 1.

Figure 17:
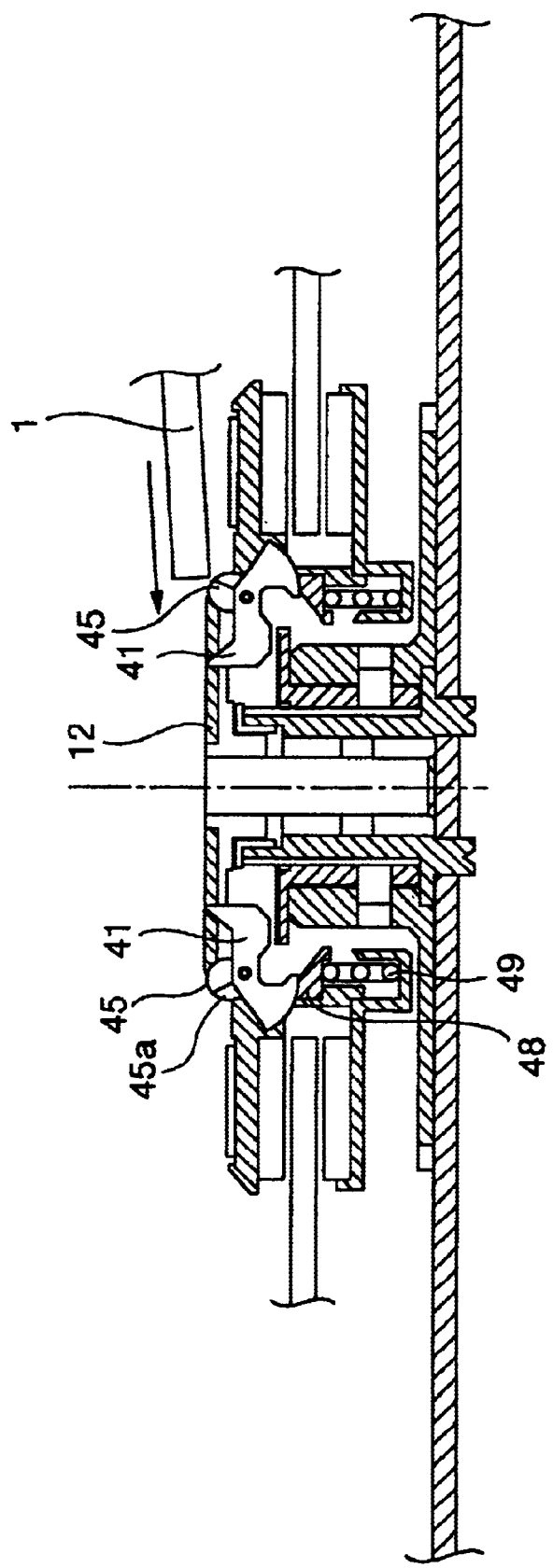
FIG. 17 shows the state in which the disk medium is inserted on the skew with respect to a center hub.

FIG. 17 shows a state in which a disk medium is inserted on the skew (or in an inclined condition) with respect to the center hub. The releasing inclined surface 45a in the form of coupled semicircles is formed on the outer periphery of the releasing section 45. Thus, the disk medium can be retracted into the disk drive apparatus without hindrance, even if the disk medium is inserted on the skew with respect to the center hub 12.

In FIG. 15, the rotary platform 10, rotating means 20, reciprocating means 30, and holding/releasing means 40 are concentrically combined to form an integrated arrangement having a thickness t of 11.5 mm or less (the thickness being measured from the contour of the base 19 to the end of the clamp member 41). Thus, the thickness of the entire disk drive apparatus including the space for transferring the disk 1 can be reduced to 12.7 mm or less. Consequently, the disk drive apparatus can be installed in a notebook computer, which is required to be small and thin. Thus, a highly convenient disk drive apparatus can be provided to a user.

As described above, according to the invention, releasing/holding means is generally in the shape of crescent, having a holding section and a releasing section located at positions opposite to each other with the swivel center located therebetween. That is, the holding section and the releasing section are located on opposite sides with respect to the swivel center. A plurality of such releasing/holding means are radially disposed on the rotary platform means and each of them is pivotally or swingably mounted on a shaft. A disk can be raised above the rotary platform means by swinging or swiveling the releasing/holding means.

Thus, with the use of the releasing/holding means of the invention, it becomes possible to attach, hold and release a disk simply by transferring the disk to a predetermined place. Thus, the need for moving the disk in a direction perpendicular to the disk plane or holding the disk from both sides of the disk is eliminated and therefore a thin disk drive apparatus can be provided that has a smaller number of components and is easy to handle.

As described above, the present invention can provide a medium attaching method and a disk drive apparatus that eliminates the need for a drawing/transfer mechanism and vertical transfer mechanism to reduce the thickness of the entire apparatus to 12.7 mm or less and allows the automatic attachment, holding, and releasing of a disk.

What is claimed is:

1. A medium attaching device comprising:
    a rotary platform that receives a disk-like medium placed thereon, said platform having a projection for being fitted into a center hole formed in the disk-like medium;
    a holding/releasing member radially disposed around said projection, said holding/releasing member including a holding section for attaching and holding the disk-like medium to said platform, and a releasing section for releasing the disk-like medium from said platform;
    a reciprocation member that is driven to reciprocate in a direction perpendicular to said platform and having a flange for abutting against said holding/releasing member, said reciprocation memember being driven to swivel said holding/releasing member through said flange, so as to attach and hold the disk-like medium to said platform and release the disk-like medium from said platform; and
    a rotational transfer member including a cylindrical section formed with a spiral groove and a driving section for driving said holding/releasing member, said reciprocation member having a pin engaging said groove, said transfer member being rotationally driven to swivel said holding/releasing member.

2. A medium attaching device comprising:
    a rotary platform that receives a disk-like medium placed thereon, said platform having a projection for being fitted into a center hole formed in the disk-like medium;

a holding/releasing member radially disposed around said projection, said holding/releasing member including a holding section for attaching and holding the disk-like medium to said platform, and a releasing section for releasing the disk-like medium from said platform;

a reciprocation member that is driven to reciprocate in a direction perpendicular to said platform and having a flange for abutting against said holding/releasing member, said reciprocation memember being driven to swivel said holding/releasing member through said flange, so as to attach and hold the disk-like medium to said platform and release the disk-like medium from said platform; and an optical part for reading information from the disk-like medium, an optical part reciprocation member for transferring the optical part in a radial direction of the disk-like medium, and an off and on drive member for discontinuously transmitting a driving force from the optical part reciprocation member, said optical part reciprocation member being adapted to drive said holding/releasing member to swivel through said off and on drive member.

3. A medium attaching device comprising:

a rotary platform that receives a disk-like medium placed thereon, said platform having a projection for being fitted into a center hole formed in the disk-like medium;

a holding/releasing member radially disposed around said projection, said holding/releasing member including a holding section for attaching and holding the disk-like medium to said platform, and a releasing section for releasing the disk-like medium from said platform;

a reciprocation member that is driven to reciprocate in a direction perpendicular to said platform and having a flange for abutting against said holding/releasing member, said reciprocation memember being driven to swivel said holding/releasing member through said flange, so as to attach and hold the disk-like medium to said platform and release the disk-like medium from said platform; and a rotating member for rotating said rotary platform, and an off and on engaging member for discontinuously transmitting a rotational driving force from said rotating member, said rotating member being adapted to drive said holding/releasing member to swivel through said off and on engaging member.

4. A disk drive apparatus using the medium attaching device according to any one of claims 1 to 3.

5. A disk drive apparatus according to claim 4, wherein the thickness of the entire disk drive apparatus is 12.7 mm or less.

* * * * *